S. Dustin,
Steam-Boiler Indicator.
No. 937. Reissued Mar. 27, 1860.
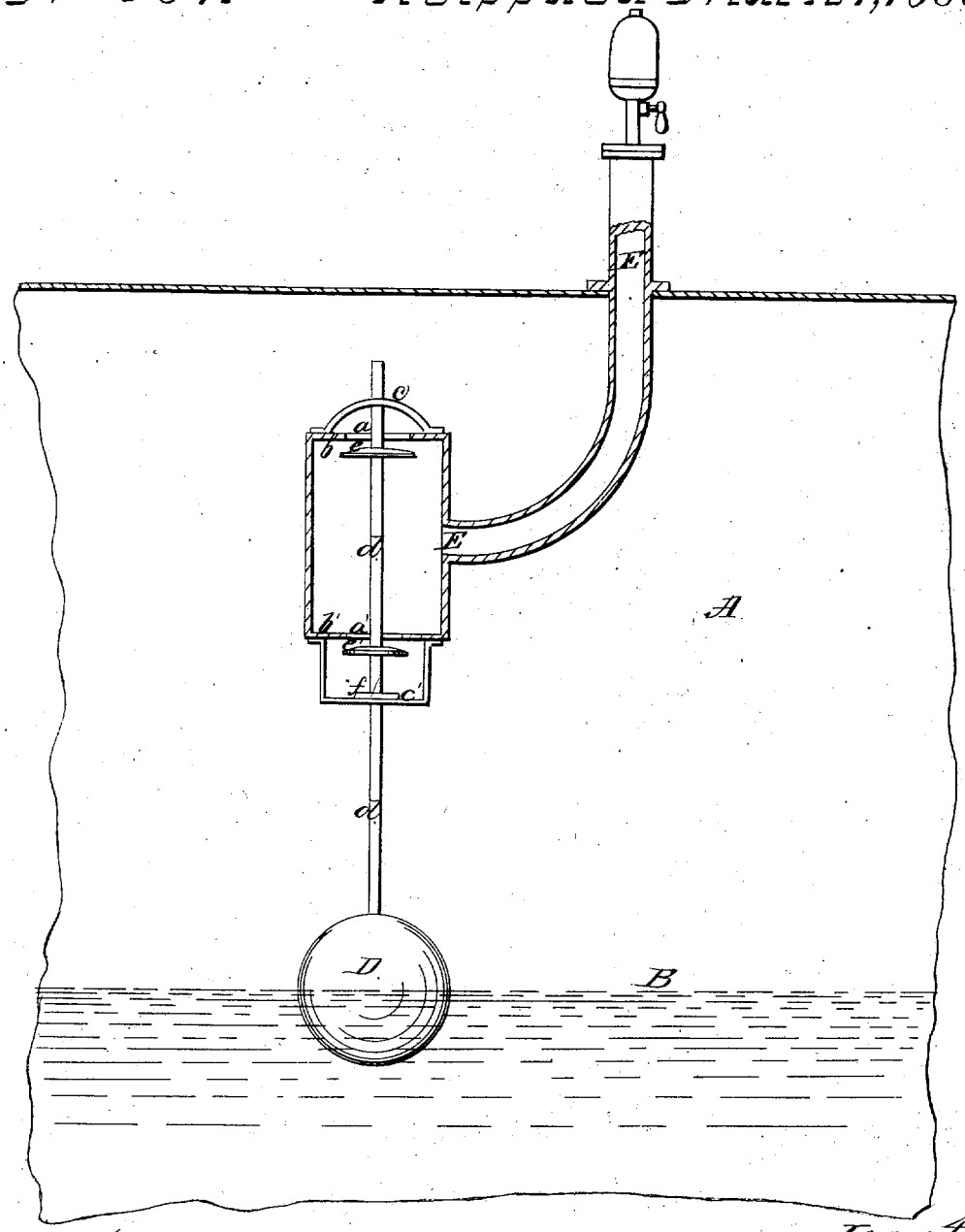
Witnesses:
J. Cohen
H. A. Kipperman
Inventor
Selah Dustin
per atty A. B. Stoughton
N. PETERS, PHOTO-LITHOGRAPHER, WASHINGTON, D. C.

UNITED STATES PATENT OFFICE.

SELAH DUSTIN, OF DETROIT, MICHIGAN.

LOW-WATER ALARM FOR STEAM-BOILERS.

Specification forming part of Letters Patent No. 23,761, dated April 23, 1859; Reissue No. 937, dated May 27, 1860.

*To all whom it may concern:*

Be it known that I, SELAH DUSTIN, of Detroit, in the county of Wayne and State of Michigan, have invented certain new and useful Improvements in Low-Water Alarms for Steam-Boilers; and I do hereby declare the following to be a full, clear, and exact description of the same, reference being had to the accompanying drawing, making a part of this specification, and which represents in section so much of a steam-boiler as will illustrate the invention, and showing also the low-water-alarm apparatus connected therewith partially in section and partially in full, the ball, rod, and valves being uncut.

I am aware that there have been many contrivances essayed for giving an alarm, or for indicating when the water becomes too low, or when there is an excessive pressure of steam in a steam-boiler; and I am also aware that a steam-chamber has been used inside of a boiler in connection with such contrivances, and that a rod has been inserted through the shell of the boiler, so that the engineer could test the action of the valve in said interior steam-chamber to ascertain whether it was in perfect acting order; but I do not claim these things independently of my plan of constructing and operating my low-water or high-steam alarm or indicating apparatus.

My invention consists in so combining a steam valve and chamber with a float or ball as that the pressure of the steam in the boiler will open said valve when the water falls so low in the boiler that the upward force of the float does not sustain said valve, and so that said valve shall have the aid of the ball or float in opening it; and it further consists in combining with such a valve as is opened by the pressure of the steam and the aid of the ball or float another valve, that keeps the steam-cylinder closed so long as the water in the boiler remains at the proper height therein and the pressure of the steam does not exceed a certain amount; and it further consists in combining with a valve opened by the pressure of the steam and by the aid of the ball or float, and without being resisted by a weight or weighted lever, a steam-whistle, bell, or other means of giving an alarm by the escape of steam; and it further consists in combining with a float and a steam-chamber two valves of differential area, so that when there is an excessive pressure in the boiler the differential pressure thereon will open the valves by forcing the float deeper into the water, and thus allow the steam to escape and blow a whistle or sound an alarm.

To enable others skilled in the art to make and use my invention, I will proceed to describe its construction and operation in connection with the drawings.

A represents a portion of a steam-boiler, in which the proper water line is shown at B. C is a steam chamber or cylinder connected to said boiler in such position as that the ball or float D, which is controlled by the height of the water in the boiler, may through its rod or stem *d*, that connects it with said steam-chamber, act to open or close the inlets to said steam-chamber just as the sustaining-power of the water or the pressure of the steam, or both, may determine or require.

The steam-cylinder C has an opening, *a a′*, in each of its heads *b b′*, and the stem *d*, connected to the ball or float D, carries two valves, *e e′*, that close or open, respectively, the passages *a a′* as the height of the water in the boiler and the sustaining-power of the float and the pressure of the steam may determine. The area of the valve *e* is somewhat greater than the area of the valve *e′*, so that the difference of pressure upon them aids to open the valves when the water falls so low in the boiler as that the upward force of the ball or float does not sustain them.

*c c′* are guides on the heads of the steam-cylinder C, and *f* is a collar or stop on the stem *d*, to prevent the stem from slipping through too far, the object of these devices being to keep the valves in proper position for opening and closing their respective steam-passages, which correspond with them in area. The valve *e* may be termed the "active" valve, as it is through the opening of this valve that the steam finds egress through the steam cylinder C, the pipe E, and to a whistle, or other alarm on the ouside of the boiler, which indicates when the water is so low in the boiler as to allow the steam to open said valve. The other valve, *e′*, may be termed an "inactive" or "negative" valve, because it simply acts to close and keep closed the entrance to the steam-cylinder when the water is high enough in the boiler to cause the upward pressure of the float to keep it to its seat; but when this upward pressure of the float ceases the greater steam-pressure upon the valve *e* forces open the valve *e'*, the weight of the float lending its assistance to the valve *e* to so open the steam-chamber to the free egress of the steam through it to the alarm apparatus. The greater pressure upon the valve *e*, owing to its greater surface, might of itself be sufficient to open the steam-chamber; but I prefer to so connect the float to it as that the weight of the float shall aid in opening said valve *e*, and through it the valve *e'*.

The differential pressure on the two valves *e e'*, the former being the larger of the two, can be caused to blow the whistle against the upward tendency of the float D; or in other words, the maximum pressure at which the boiler is to be worked having been determined, if it is exceeded that differential pressure will force the float down below the water or buoyant line, and thus blow the whistle and give an alarm of excessive pressure as well as in case of low water.

I have represented the rod or stem *d* as being straight, which brings the float immediately underneath the steam-cylinder. I do not confine myself to this arrangement, as the rod or stem may be horizontal or bent, so as to act as a lever of the first order.

A principal feature in my low-water-alarm apparatus is the fact that I do not necessarily require any packed joints between the steam in the boiler and the alarm on the exterior thereof, and hence can rely on the unvarying action of the float and the valves, though, as a matter of entire certainty, the common well-known try rod or lever may be arranged over the valves to ascertain whether the valves and float are in proper acting order.

The operation of this apparatus is obvious. When there is a sufficiency of water in the boiler, the upward force of the float holds the valves to their seats, and no steam can escape that would operate the alarm apparatus; but when the water falls below the proper height the pressure of the steam upon the larger valve *e*, together with the weight of the float, opens the steamway through the steam-chamber, and the steam escaping through it and through the pipe or tube E sounds the alarm. By reversing the action of this apparatus it may be made to indicate when there is a proper supply in the boiler, and two appliances may be used—one to indicate or alarm when the water is too low and the other when the deficiency is supplied—and either of these contrivances may be connected with mechanism that will supply the water or cut off the supply when the necessary quantity is furnished.

This apparatus, too, when there is an excessive pressure of steam in the boiler, by the differential areas of its valves causes the float to sink deeper in the water, and thus open to the issue of the steam, which will blow the whistle, and thus become an excessive-steam indicator as well as a low-water indicator.

What I claim as my invention, and desire to secure by Letters Patent, is—

1. So combining a steam valve and chamber with a ball or float as that the pressure of the steam in the boiler, in conjunction with the weight of the ball or float, will, when the water falls so low in the boiler that the upward force of the float does not sustain such valve, open said valve and make a free escape of the steam, substantially as described.

2. In combination with a valve that is opened by the pressure of the steam and the aid of the ball or float, another valve, *e'*, of lesser area, that closes one end of the steam-cylinder so long as the water in the boiler remains at the proper height therein and the pressure of the steam does not exceed a certain amount, substantially as described.

3. In combination with a valve opened by the pressure of the steam and by the aid of the ball or float, and which are not resisted by a weight or weighted lever, a steam-whistle, bell, or other means of giving an alarm by the escape of the steam, substantially as described.

4. The combination of the float and the differential valves with the steam-chamber for the purpose of opening said valves by immersing the float deeper in the water, to sound an alarm when there existed an excessive pressure of steam in the boiler, substantially as described.

SELAH DUSTIN.

Witnesses:
THOS. H. UPPERMAN,
E. COHEN.